United States Patent [19]

Breuers et al.

[11] 4,179,112
[45] Dec. 18, 1979

[54] APPARATUS FOR CONVEYING SHEETLIKE ORIGINAL MATERIAL TO BE COPIED

[75] Inventors: Theo P. C. Breuers, Venlo; Joannes J. W. M. Joosten, Baarlo, both of Netherlands

[73] Assignee: Oce-van der Grinten N.V., Venlo, Netherlands

[21] Appl. No.: 850,291

[22] Filed: Nov. 10, 1977

[30] Foreign Application Priority Data

Nov. 16, 1976 [NL] Netherlands .......................... 7612693

[51] Int. Cl.² .......................... B65H 9/10; B65H 5/18; B65H 9/08
[52] U.S. Cl. .......................... 271/3; 271/272; 271/301; 355/3 SH
[58] Field of Search .............. 271/65, 3, 184, 185, 271/186, 187, DIG. 9, 272, 273, 274, 80, 64; 355/35

[56] References Cited

U.S. PATENT DOCUMENTS

| | | | |
|---|---|---|---|
| 3,661,383 | 5/1972 | Morrison | 271/64 |
| 3,863,913 | 2/1975 | Hirafuji | 271/80 |
| 3,917,256 | 11/1975 | Kubasta | 271/65 |
| 4,066,252 | 1/1978 | Wick | 271/3 |

Primary Examiner—Robert B. Reeves
Assistant Examiner—Brian M. Bond
Attorney, Agent, or Firm—Albert C. Johnston

[57] ABSTRACT

An apparatus for conveying a sheetlike original to be copied through the exposure section of a copying machine and back again when multiple copies are desired includes an original return means having at least two sets original sheet gripping and conveying elements which have been mounted in a common supporting element which can be displaced cyclically to a number of positions, whereby, in each position of the supporting element and with the return means activated, one set occupies a position located in the path of movement of an original leaving the exposure section, and another set occupies a second position located in the path of movement joining the entry to the exposure section. The apparatus further includes switching elements for switching the gripping and conveying elements of each set on and off, whereby the gripping elements are switched off and the conveying elements are switched on as soon as a set arrives into the second position, and the gripping elements are switched on and the conveying elements are switched off when a set is in the first position and after an original has been taken up by the gripping element in this set by at least its leading edge, and means for displacing the supporting element after the trailing edge of an original has passed the entry of the exposure section. Each set of gripping and conveying elements may comprise a pair of rollers which can be driven so that the leading edge of the original can be gripped with the risk of damage minimized while the gripping element allows a wrinkled or folded edge of the original to pass without difficulty.

13 Claims, 7 Drawing Figures

APPARATUS FOR CONVEYING SHEETLIKE ORIGINAL MATERIAL TO BE COPIED

This invention relates to an apparatus for conveying sheetlike original material to be copied past the exposure window of a copying apparatus and more particularly to such an apparatus for selectively repeatedly conveying the original through the exposure section for making multiple copies.

A known conveying apparatus comprises a feed section for feeding the original sheet to be copied, an exposure section containing an exposure window and provided with an entry, an exit and conveying and guiding elements, and an ejection section and means, to be engaged selectively, for returning the original from the exit to the entry of the exposure section for another pass therethrough. An apparatus of this type is disclosed in copending application Ser. No. 437,152 filed Jan. 28, 1974, now U.S. Pat. No. 4,058,359, issued Nov. 15, 1977. In the apparatus shown therein, an original sheet, which has passed the exposure section and must be reintroduced to the exposure section for further copying, is returned to the feed section over a return path having a fixed length. In order to avoid overlapping of the leading edge of long originals by the trailing edge, and thus preventing ejection of the original, the length of the return path is made sufficiently long so that overlapping cannot occur even with the longest available originals. Consequently, such an apparatus exhibits the disadvantage that short originals, which do not have the overlapping problem, must cover the same long return path resulting in relatively much lost time during which the copying machine is not being used for copying.

A solution for such a problem is proposed in U.S. Pat. No. 3,614,090. In that patent an apparatus of the type described above is disclosed as being provided with a rotatable gripping device for conveying the original. The leading edge of the original to be copied is brought into this gripping device and retained therein during conveyance through the exposure section while the gripping device keeps rotating. When more than one copy must be made of the original, the gripping device is stopped with the leading edge of the original extending beyond the exposure section. In the meantime, the conveyance of the trailing part of the original is continued by means of supplemental drive belts and the original gradually accumulates in the form of a loop between the now stationary gripping device and the ejection side of the exposure section. When the trailing edge of the original has entered the exposure section, the gripping device is again set into rotational movement, so that the leading edge of the original is once again conveyed through the exposure section. After the desired number of exposures have been carried out, the gripping device is opened and the original is conveyed away.

An advantage of the apparatus disclosed in the patent is that it is possible to make a number of copies, one after the other, irrespective of the length of the original, while at the same time the leading edge of the original can be conveyed through the exposure section closely behind the trailing edge in each exposure cycle so that loss of time and loss of copying material can be limited to a minimum. A disadvantage of such an apparatus, however, is that the gripping device always covers a portion of the edge of the original, which may result in loss of information on the copy. Moreover, difficulties may occur during the introduction of the edge of the original into the gripping device when this edge is not fully flat, for example, wrinkled or folded, as is often the case in practice. Also the risks of encountering such difficulties increases in proportion as the width of the original increases. Furthermore, since the type of gripping device applied in such an apparatus presents an obstruction which cannot be passed by the original, extra provisions must be made, even in the case of an original with a fully flat edge, to obtain an exact coordination as is possible between the movement of the original and the movement of the gripping device.

An object of this invention is the provision of an apparatus for conveying sheetlike original material which avoids the foregoing disadvantages of the known apparatus while at the same time obtaining the advantages described.

This object is achieved, according to this invention, through the provision of an original sheet conveying apparatus in which the original return means comprises at least two sets of original sheet gripping and conveying elements, which have been mounted in a common supporting element which can be displaced cyclically to a number of positions, whereby, in each position of the supporting element and with the return means activated, one set occupies a position located in the path of movement of an original leaving the exposure section, and another set occupies a second position located in the path of original movement joining the entry to the exposure section. The apparatus further comprises switching elements for switching the gripping and conveying elements of each set on and off, whereby the gripping elements are switched off and the conveying elements are switched on as soon as a set arrives into the second position, and the gripping elements are switched on and the conveying elements are switched off when a set is in the first position and after an original has been taken up by the gripping elements in this set by at least its leading edge, and means for displacing the supporting element after the trailing edge of an original has passed the entry of the exposure section. Thus, according to this invention, the original to be copied is conveyed through the exposure section without its leading edge being covered by any gripping device, so that during copying no information present on the original is lost in the copy.

According to a preferred embodiment of this invention, each set of gripping and conveying elements comprises a pair of rollers which can be driven. In this manner, the leading edge of the original can be gripped without the risk of damage and without the necessity to follow an extremely precise time scheme. Furthermore, this provides a gripping element which allows a wrinkled or folded edge of the original to pass without difficulty and no complicated mechanism is required to achieve or interrupt the gripping operation.

The foregoing and other objects, features and advantages of this invention will be further apparent from, and the invention will be further explained in, the following description of preferred embodiments thereof taken in conjunction with the accompanying drawings in which.

Figure 1:
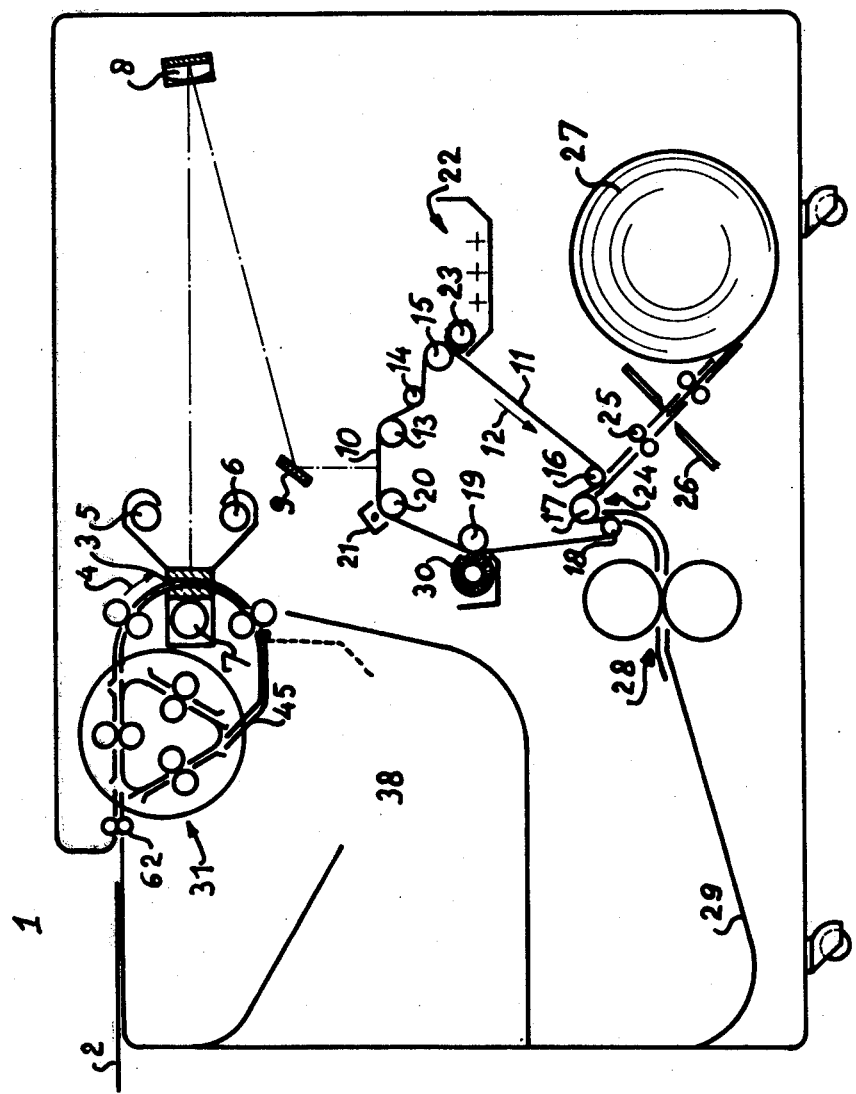
FIG. 1 is a schematic illustration, in section, of a copying machine provided with an original sheet conveying apparatus according to an embodiment of this invention.
Figure 2:
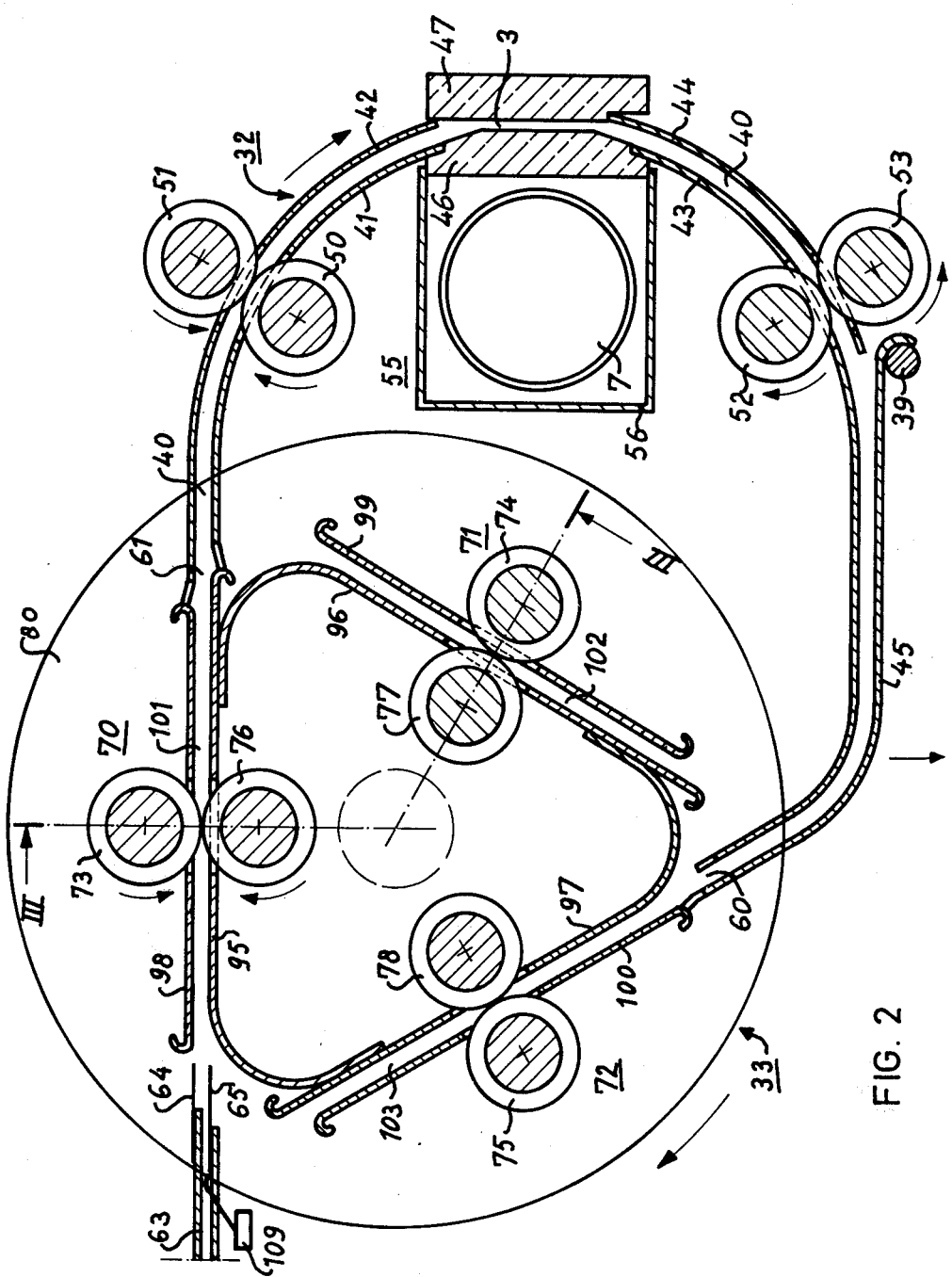
FIG. 2 is an enlarged detail view, in section, of an apparatus according to an embodiment of this invention.

Referring to FIG. 1, there is schematically shown a copying machine of the type in which the present invention finds utility. In the copying machine 1, an original 2 is conveyed with a constant speed past an exposure slit 3 which extends in a direction perpendicular to the plane of the drawing of FIG. 1. An arrow 4 indicates the direction of movement of the original 2. The original 2 is exposed in the slit 3 by the lamps 5, 6, 7. An image of the original is projected, via an optical system 8 and 9, on that part of the photosensitive surface of an electrophotographic endless belt 11 which is situated in the projection plane 10. The belt 11 is transported in the copying machine with a constant speed in the direction indicated by the arrow 12 by a number of rollers 13 through 20. Before the exposure takes place near 10, the belt 11 is electrostatically charged with the aid of a corona charging device 21. Those parts of the photoconductive layer which are struck by the light as a result of the projection of the image are discharged, so that a latent electrostatic image is produced on the belt 11 which corresponds with the image of the original 2. Upon further movement of the belt 11, the latent electrostatic image passes a developing device 22. In this device, developing powder is brought into contact with the belt surface with the aid of a magnetic brush 23 in order to develop the latent image and to convert it into a powder image.

The powder image is transported by the belt 11 to a transfer device 24 in which the powder image is brought into contact with a sheet of receiving material which is moved with the same speed as the belt 11 and on to which the powder image is transferred, if so desired, using a suitable electric field. The sheet of receiving material, such as paper, is supplied by supply elements 25 after it has been cut off by a cutting device 26 from a roll 27. After the sheet has been separated from the belt 11, it is conveyed to a fixing device 28 in which the transferred powder image is fixed and subsequently conveyed to the receiving tray 29. That part of the powder image on the belt 11 that is not transferred to the sheet, is transported, together with the belt 11, to a cleaning device 30 in which it is removed from the belt.

The copying machine includes an apparatus 31, according to the invention, with which the original 2 can be conveyed one or more times past the exposure slit 3. The copying machine also includes known suitable driving elements and guiding elements for conveying an original 2, for driving the belt 11 in time dependence with the conveyance of the original 2, for supplying and for conveying receiving material through the transfer device 24, through the fixing device 28 and to the receiving tray 29.

The apparatus 31 by which the original 2 can be conveyed one or more times past the exposure slit 3, is represented in greater detail in FIGS. 2 through 6. The apparatus 31 comprises an exposure section 32 and a supporting element 33 which are fixed between the frame plates 23 and 24 of the copying machine. The exposure section 32 comprises a conveying path or track 40, in which the original 2 is conveyed by a number of guiding and conveying elements past the exposure slit 3. The conveying track 40 is formed by the guiding elements 41, 42, 43, 44 and 45 which comprise curved plates which have been fixed to the frame plates 23 and 24. The glass plates 46 and 47 form the exposure slit 3, which also forms part of the track 40. A tube lamp 7 is installed in the space 55 in a housing 56 in the manner described in copending patent application Ser. No. 737,048 filed Oct. 29, 1976 and assigned to the assignee of the present application.

Within the track 40, the original 2 is conveyed by two pairs of disc rollers 50, 51, 52, 53 which extend through suitable openings in the guiding elements 41 through 44 and into the track 40. The disc rollers 50, 51, 52, and 53 are rotatably supported in bearings located in the frame plates 23 and 24 and are driven in pairs by suitable drive elements, such as chains and chain gears, in the direction indicated by the arrows. The supporting element 33 is installed between the exit 60 and the entry 61 of the track 40.

The supporting element 33 comprises two circular end plates 80 and 81 and is rotatably installed in the frame plates 23 and 24 by means of the shaft ends 120 and 85 and the ball bearings 119 and 84, respectively. The end plates 80 and 81 rotatably support three roller-pairs 70, 71, and 72 in bearings. The roller-pairs 70, 71, and 72 respectively comprise the rollers 73, 74, and 75 which can be driven, and the freely rotatable rollers 76, 77 and 78. The roller 76, and similarly also the rollers 77 and 78, is freely rotatably supported in the ball bearings 82 and 83 between the end plates 80 and 81.

Figure 3:
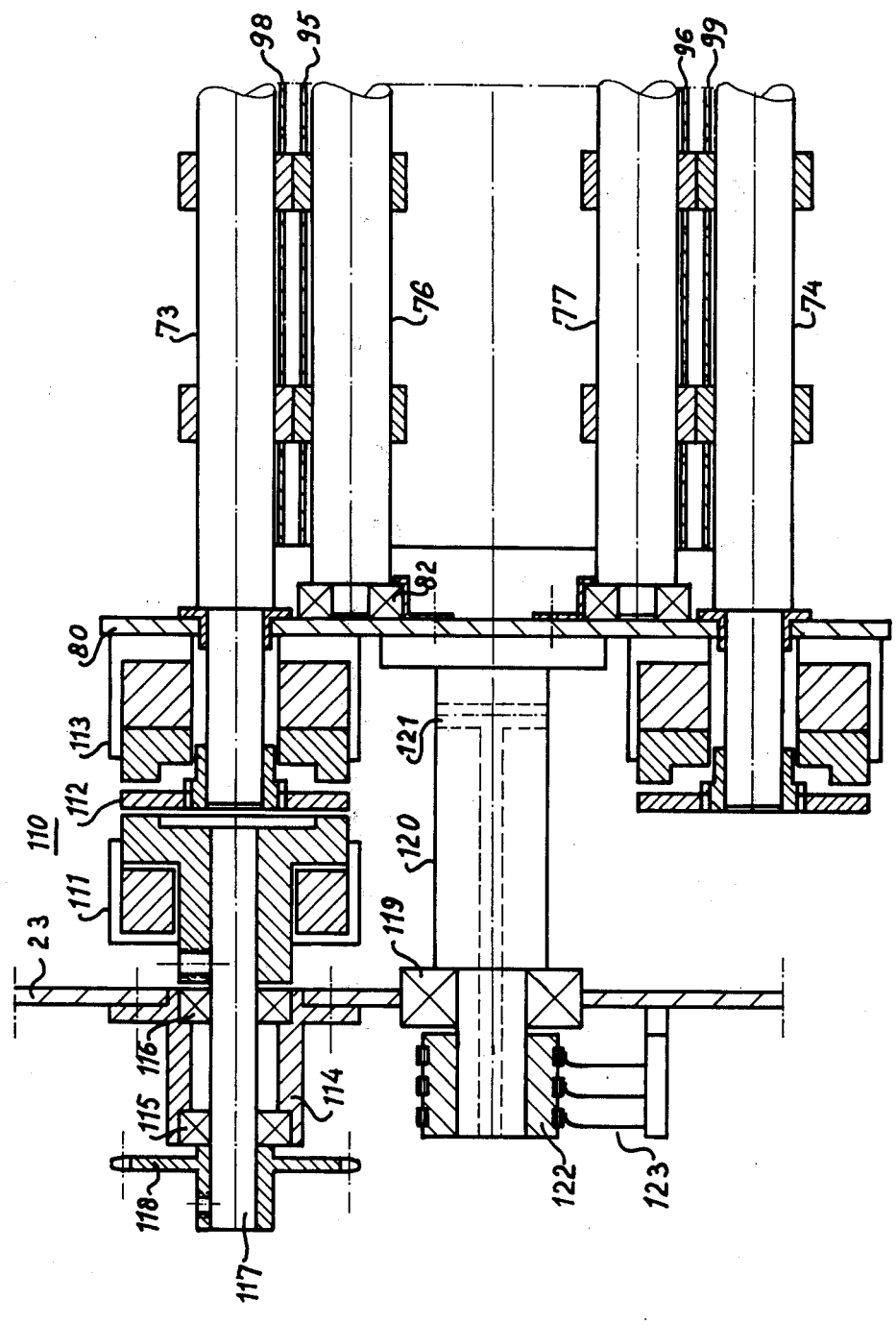
FIG. 3 is a view, in section, of a first embodiment of the supporting element taken along the line III—III in FIG. 2.

The roller 73 is driven through a coupling disc 112 which forms part of a magnetic coupling 110. The magnetic coupling 110 further comprises a magnetic drive coupling 111 and a magnetic brake coupling 113. The magnetic drive coupling 111 is fixed on a shaft 117 which is rotatably supported in bearings in the frame plate 23 by means of the bushings 114 and the ball bearings 115 and 116. A chain gear 118 is fixed on the shaft 117 and is continuously driven by a chain (not shown). Each of the rollers 73, 74, and 75 is provided with a coupling disc 112 and a magnetic brake coupling 113. However, a drive coupling 111 as shown in FIG. 3 is installed in the frame plate 23 only opposite the rollers 73 and 75.

The supporting element 33 further comprises a number of guide plates 95 through 100. The guide plates 95, 96 and 97 are connected with each other to form a closed triangular body, and are provided with suitable openings through which the discs of the disc rollers 76, 77 and 78, respectively, extend. Opposite each of the guide plates 95, 96 and 97 are installed the guide plates 98, 99 and 100, respectively. The guide plates 98, 99 and 100 are also provided with suitable openings through which the discs of the disc rollers 73, 74 and 75, respectively, extend.

Figure 6:
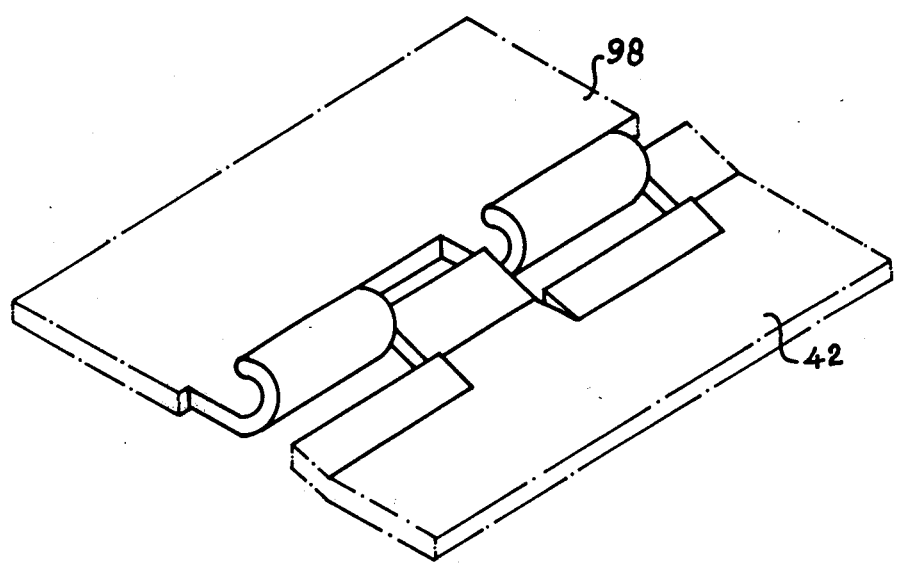
FIG. 6 is a perspective view of the guides for the original sheet as seen at the time of the transition between the supporting element and the fixed guide track of the exposure section.

In this way, the conveying tracks 101, 102, and 103 are formed in the supporting element 33. As shown in FIG. 6, the various guide plates such as 98 and 42 are provided with toothed edges whereby the various tracks communicate with each other. By this contruction, it is possible to change the tracks 101 through 103 cyclically, while the guide plates overlap each other, so that the original sheet sees an uninterrupted path of conveyance. The guide plate 45 is fixed on a rotatable shaft 39 and can be moved from the closed position, as illustrated by the solid line in FIG. 1, into an open position, as illustrated by the dotted line in FIG. 1, and reversed, by rotating the shaft 39. The rotation of the shaft 39 is obtained using a conventional cam disc and a drive bar mechanism (not shown).

The shaft end 120 is provided with a gliding contact 122 and an opening 121. Electric wiring is installed through the opening 121 to provide signal communication between the gliding contact 122 and the brake couplings 113 of the magnetic couplings 110. The control signals for the brake couplings 113 are supplied to the gliding contact 122 through a number of fixed contacts 123.

Figure 5:
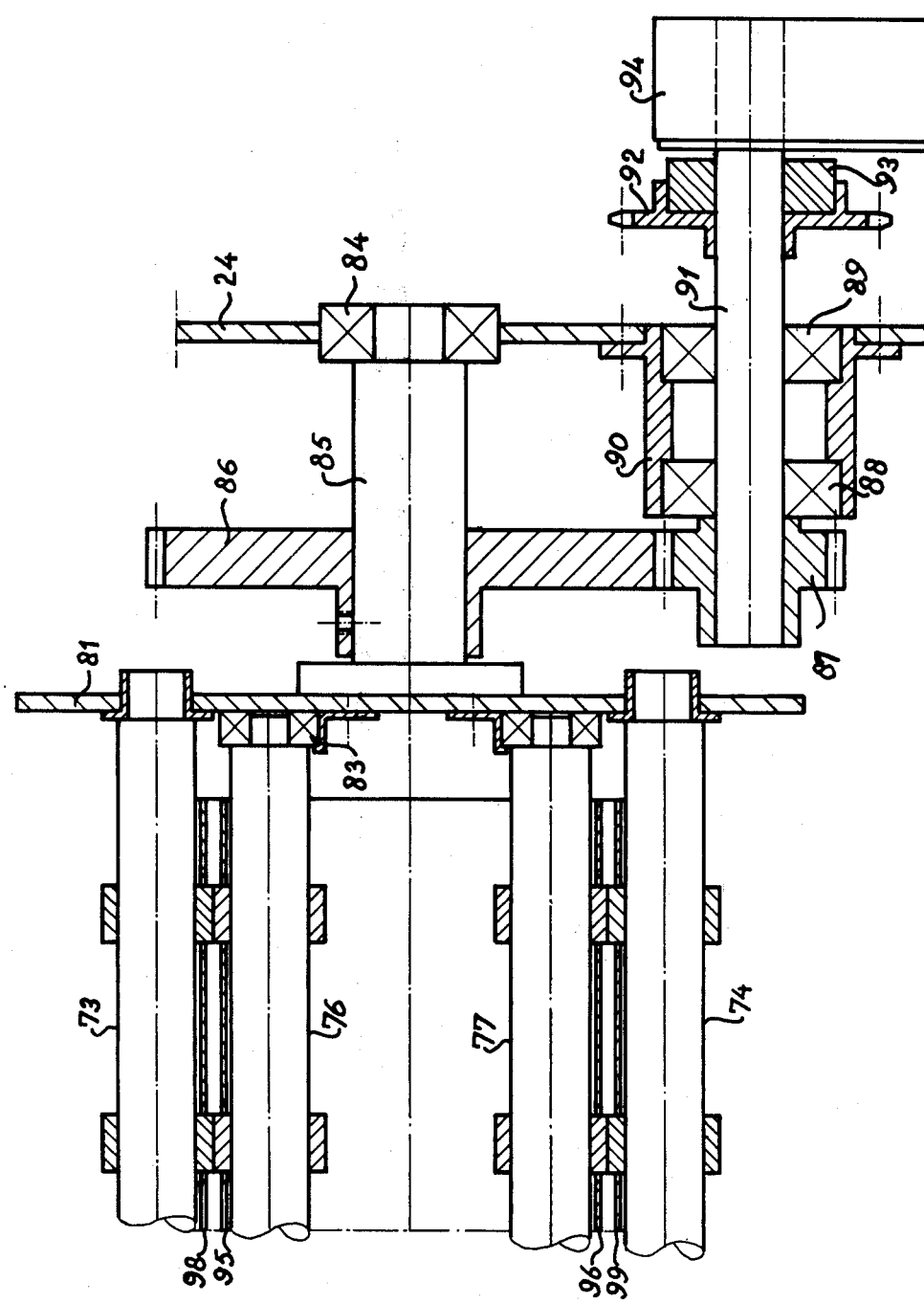
FIG. 5 is a view, in section, of the drive of the support element.

FIG. 5 illustrates the mechanism by which the supporting element 33 can be rotated. A gear 86 is fixed on the shaft end 85. The gear 86 engages a gear 87 which is fixed on a shaft 91. The number of teeth on the gear 86 is three times the number of teeth on the gear 87. The shaft 91 is rotatably supported in the frame plate 24 with the aid of a bushing 90 and the ball bearings 88 and 89. The shaft 91 is driven through a magnetic coupling 94 with a coupling disc 93 by a chain gear 92 which is freely rotatable on the shaft 91 and is continuously driven. The magnetic coupling 94 is of the type which, after a short energization, maintains itself energized until the driven shaft has made one revolution, after which the energization is interrupted.

The above described embodiment of the apparatus according to this invention operates as follows. For identification the various parts of the magnetic couplings 110 are indicated as follows. The coupling discs 112 and the brake couplings 113 are further specified with reference to the roller on which they have been installed. Thus 113-73, for instance indicates the brake coupling 113 which is mounted on the disc roller 73. The two driving couplings 111 are distinguished as drive coupling 111-A, which in FIG. 2 lies opposite the roller-pair 70, and a drive coupling 111-B, which in FIG. 2 lies opposite the roller-pair 72.

Figure 7:
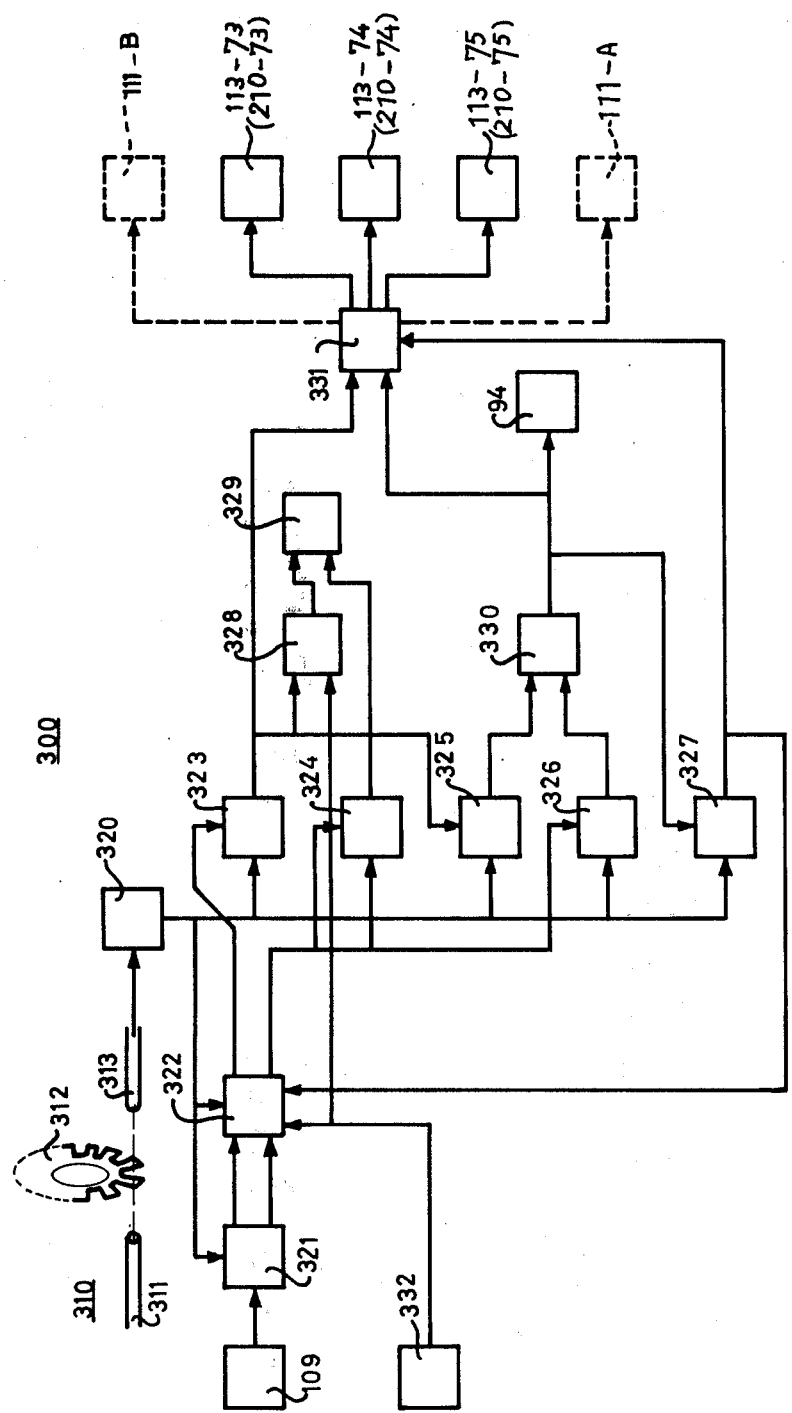
FIG. 7 is a block diagram of an embodiment of the control system associated with the apparatus according to this invention.

The original sheet 2 to be copied is introduced, via the roller-pair 62 (FIG. 1), in the conveyor track 63. A detector 109, for example a micro switch, is installed and senses the presence or absence of the original and transmits this information to a control circuit 300 (FIG. 7). The roller-pairs 70 and 72 are both driven by the respective energized drive couplings 111-A and 111-B. The roller-pairs 50, 51 and 52, 53 are also driven and the guide plate 45 is in its closed position. The original 2 is brought into the conveyor track 101 by the roller-pair 62 through the conveyor track 63 which is joined to it by means of two flexible strips 64 and 65, made, for example, of material available under the trademark Melinex. In the conveyor track 101, the original is further conveyed by the roller-pair 70, and from there it is brought into the conveyor track 40 where it is conveyed by the roller-pairs 50, 51 and 52, 53 past the exposure slit 3 to the exit 60.

From the exit 60, the leading edge of the original arrives in the conveyor track 103, where it is gripped by the roller-pair 72. After the leading edge of the original has passed the roller-pair 72, this roller-pair is brought to a stop by interrupting the energization of the drive coupling 111-B and by energizing the brake coupling 113-75. As a consequence, the leading edge of the original is gripped by the roller-pair 72. However, the trailing part of the original is still being conveyed by the roller-pair 52, 53. At the same time when the roller-pair 72 is stopped, the guide plate 45 is brought into the open position. As a result the trailing part of the original sheet is suspended in an ever-increasing loop in the space 38 (FIG. 1) between the roller-pair 52, 53 and the entry of the conveyor track 103.

The process described above continues until the trailing edge of the original sheet has entered the conveying track 40. At that time, the energization of the drive coupling 111-A is interrupted. Since the energization of the drive coupling 111-B has also been interrupted, the supporting element is now disconnected from the driving parts of the copying machine. The magnetic coupling 94 is then energized and the gear 87 makes one revolution with the shaft 91. Since the number of teeth of the gear 86 is three times greater than the number of the teeth of the gear 87, the gear 86 and, consequently, the shaft end 85 and the supporting element 33 are rotated over an angle of 120°. As a result, the brake coupling 113-75 is now located opposite the drive coupling 111-A and the brake coupling 113-74 is now located opposite the drive coupling 111-B.

The original sheet is still positioned with its leading part held between the disc rollers 75 and 78. The trailing part of the original sheet is freely suspended in the space 38 from the entry of the conveyor track 103 which is now horizontal, and over that end of the guide plate 99 which is now located at the upper side. As soon as the trailing edge of the original sheet has left the conveyor track 40 via the roller-pair 52, 53, the guide plate 45 is again moved to the closed position. In the meantime, the energization of the brake couplings 113-75 and 113-74 has been interrupted and the drive couplings 111-A and 111-B have again been energized. Subsequently, the original sheet is conveyed for the second time in the manner described above through the conveyor track 40 past the exposure slit 3. In case the original sheet must be transported n-times past the slit 3, the guide plate 45 is kept in the open position from the $(n-1)^{th}$ time. As a consequence, afther the $n^{th}$ time the original sheet is conveyed to the space 38 from the track 40 through the opened guide plate 45.

Figure 4:
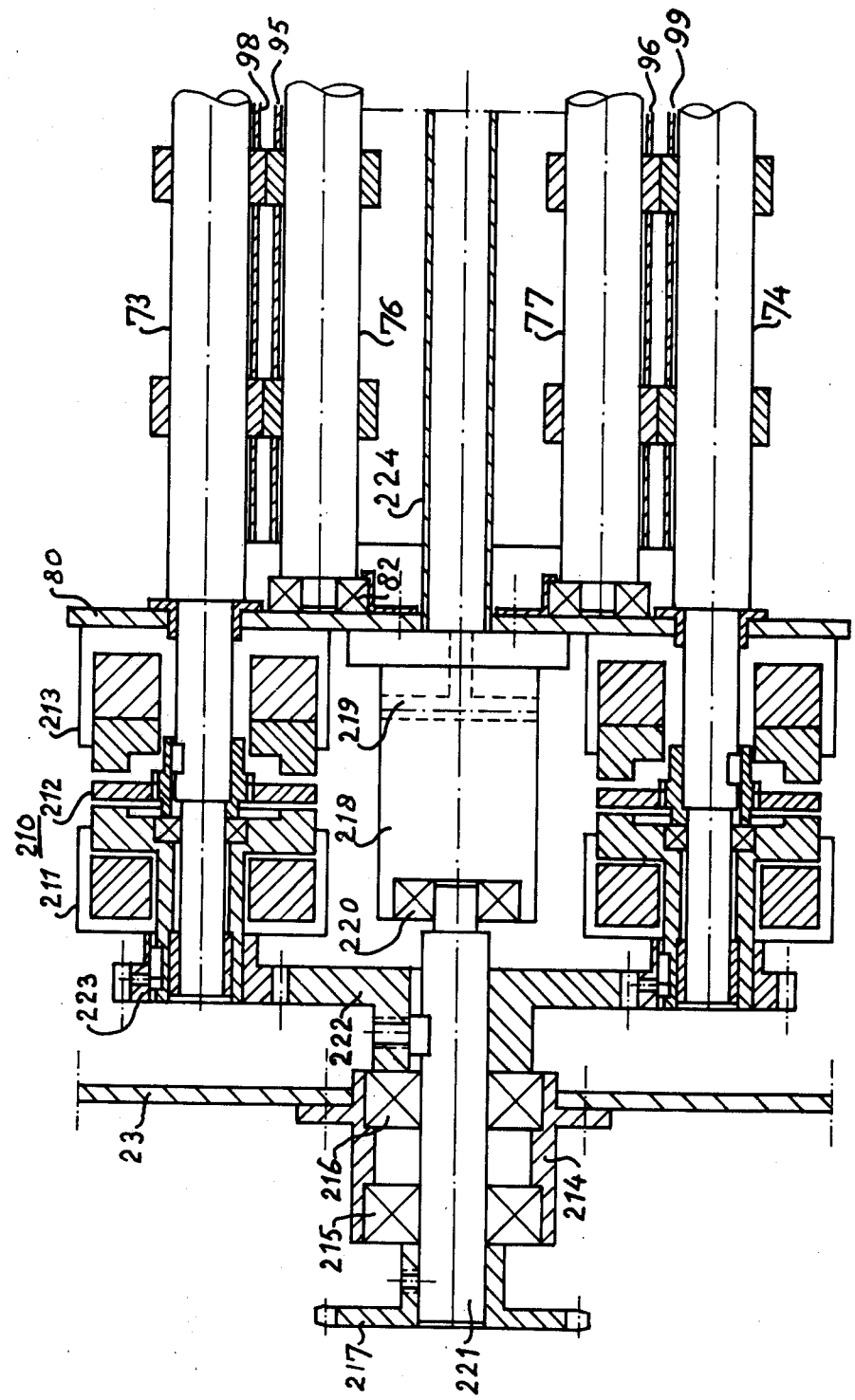
FIG. 4 is a view, in section, of a second embodiment of the supporting element, taken along the line III—III in FIG. 2.

FIG. 4 illustrates a second embodiment for driving the roller-pairs 70, 71 and 72. A shaft 221 is rotatably installed in a bushing 214 in the frame plate 23 by means of the ball bearings 215 and 216. A chain gear 217 located on the shaft piece 221 is continuously driven by a chain (not shown). The centerline of the shaft piece 221 coincides with the centerline of the supporting element 33. The end plate 80 supports a shaft end 218 by a ball bearing 220 on the shaft piece 221. A gear 222 on the shaft piece 221 engages a gear 223 which is located on the drive coupling 211 of a magnetic coupling 210. The energized magnetic drive coupling 211 can drive the roller 73 through a coupling disc 212. The magnetic coupling 210 also contains a magnetic brake coupling 213 which, when energized, can maintain the roller 73 in a stationary position through the coupling disc 212. The rollers 74 and 75 are also connected through an identical magnetic coupling and an identical gear with the gear 222. The gear 223 and the corresponding gears on the rollers 74 and 75 are continuously driven by the gear 222, the shaft piece 221 and the chain 217. The magnetic couplings are energized using electric wiring which is guided through an opening 219 in the shaft end 218 and through a conduit 224. Near the end plate 81, the conduit 224 communicates with an opening (not shown) in the shaft end 85. The shaft end 85, in this embodiment, is provided with a same contact as shown at 122 and 123 in FIG. 3.

The operation of this second embodiment is identical in principle to the operation described for the first embodiment. The small differences in operation, arising because the drive parts 211 rotate with the supporting element instead of remaining in place, are not essential for understanding the operation.

FIG. 7 illustrates, in block diagram form, an electic control circuit 300 for controlling the apparatus according to the invention. The circuit 300 comprises the following. A device 310 generates electric pulses with a frequency which is proportional to the speed of conveyance of the original sheet 2. The device 310 comprises a light source 311, a disc 312, the circumference of which is provided with a numbeer of radial grooves, a light-sensitive element 313 and a pulse generator 320. The pulse generator 320 converts the pulse-shaped signals of the element 313 to a form suitable for further processing in the circuit 300.

The disc 312 is installed in the copying machine on a shaft, such as the drive shaft of the disc roller 50, of which the angle speed is proportional to speed of conveyance of the original sheet so that the above-described proportional signal is obtained, in a manner as described in U.S. Pat. No. 3,912,390. As a result, the length of the path covered by the original sheet is always proportional to the number of pulses generated while the path is being followed, independent of the time interval which is necessary for completing the path.

The pulses from the pulse generator 320 are supplied to a delaying unit 321, a counter 322 having an adjustable count position and five counters 323, 324, 325, 326 and 327 with fixed count position. The input signal of the delaying unit 321 originates from the detector 109. The delaying unit 321 has as output signals, the signals "START-1" and "STOP-1" which are supplied to the counter 322. The counter 322 also has as input signals, the signals "RESET", originating from the copy counter 332, and "START-3", originating from the counter 327. The counter 322 has as output signals the signals "START-2" and "STOP-2". The signal "START-2" is supplied to the counter 323 and the signal "STOP-2" is supplied to the counters 324 and 326. The output of the counter 323 is connected with the counter 325, a first input of the OR-gate 328 and a distribution circuit 331. The second input of the OR-gate 328 is connected with the copy counter 332 and the output of the OR-gate 328 is connected with a first input of the mechanism 329 which causes the guide plate 45 to move from the one position to the other. The second input of the mechanism 329 is connected with the output of the counter 324. The output of the counter 325 is connected with the first input of an AND-gate 330 and the output of the counter 326 is connected with the second input of the AND-gate 330. The output of the AND-gate 330 is connected with the distribution circuit 331, the magnetic coupling 94 and the counter 327. The output of the counter 327 is connected with the counter 322 and delivers the signal "START-3". Moreover, the output of the counter 327 is connected with the distribution circuit 331.

In the first embodiment of the invention described above and shown in FIG. 3, the distribution circuit 331 has five outputs which are respectively connected with the magnetic couplings 111-B, 113-73, 113-74, 113-75 and 111-A, whereas in the second embodiment of the invention, shown in FIG. 4, there are three outputs, which are respectively connected with the magnetic couplings 210-73, 210-74 and 210-75. With the second embodiment the outputs of the distribution circuit 331 have been arranged in such a way that either the drive coupling 211 or the respective brake coupling 213 is always energized. The operation of the control circuit 300 described below is almost identical for the two embodiments. Where differences occur, the description refers to the reference numerals which relate to the first embodiment, while the corresponding reference numerals which relate to the second embodiment are set out in brackets.

The pulsegenerator 320 continuously generates pulses with a frequency which is proportional to the speed of conveyance of the original sheet through the apparatus 31. The leading edge of the original is detected in the entry way 63 by the micro switch 109. Subsequently, the delaying unit 321 is activated. After N1 pulses have appeared after the activation, a pulse signal "START-1" is generated by the delaying unit 321. In the time interval during which the N1 pulses are generated, the leading part of the original sheet is conveyed to a location between the roller-pair 70. The counter 322, which was set to zero at the switching-on of the copying apparatus, begins counting pulses in reaction to the signal "START-1". At the same time, the signal "START-2" is generated by the counter 322 to activate the counter 323. Counter 323 generates an output signal after N2 pulses. In the time interval during which the N2 pulses are counted, the leading part of the original moves from the roller-pair 70 through the exposure slit 3 and the guide plate 45 to a location between the roller-pair 72. The output signal of the counter 323 now interrupts the energization of the drive coupling 111-B (211-75) by means of the distribution circuit 331 and energizes the brake coupling 113-75 (213-75). Moreover, the mechanism 329 is set into operation by means of the OR-gate 328 to open the guide plate 45. The counter 325 starts counting N4 pulses.

After the N4 pulses have been counted, a sufficient length of the original sheet remains available between the roller-pair 72 and the roller-pair 52, 53 to cause rotation of the supporting element 33 over an angle of 120°. However, the supporting element 33 is only rotated if a second condition has been also fulfilled, namely, that the trailing edge of the original sheet has entered the conveyor track 40. This is determined as follows. At the given moment when the trailing edge passes the micro switch 109, the delaying unit 321 reacts by delivering, N1 pulses later, the signal "STOP-1" to the counter 322. At that moment, the trailing edge of the original sheet has just passed the roller-pair 70. The counter 322 reacts to the signal "STOP-1" by storing the number of pulses N7 which have entered since the signal "START-1" arrived in a memory unit and also by delivering the signal "STOP-2". The signal "STOP-2" starts the counters 324 and 326. The counter 326 counts N5 pulses during which time interval the trailing edge of the original sheet reaches the conveyor track 40. At the moment when the two counters 325 and 326 deliver an output signal, the output of the AND-gate 330 delivers a signal causing the magnetic coupling 94 to become energized, the counter 327 is started, and by means of the distribution circuit 331 the energization of the magnetic coupling 111-A (210-73) is interrupted, and the magnetic couplings 113-73, 113-74 and 113-75 (213-73, 213-74 and 213-75) are energized. The supporting element 33 is now rotated through an angle of 120°.

The counter 324 begins the counting of N3 pulses after the signal "STOP-2". During the time interval in which these N3 pulses are counted, the trailing edge of the original sheet moves to a location just beyond the roller-pair 52, 53. The guide plate 45 can then again be closed. This occurs because the mechanism 329 is set into operation by the output signal of the counter 324 in order to close the guide plate 45. After the counter 327 has been started by the output signal of the AND-gate 330, the counter 327 counts a number of N6 pulses. During the time interval in which these N6 pulses are counted, the supporting element 33 is rotated over an angle of 120°. After the counter 327 has counted N6 pulses, this counter delivers an output signal which is supplied to the distribution circuit 331 which, in response, energizes the magnetic drive couplings 111-A (211-75) and 111-B (211-74) and interrupts the energization of the magnetic brake couplings 113-75 (213-75) and 113-74 (213-74).

The output signal of the counter 327 is also supplied to the counter 322 as the signal "START-3". The signal "START-3" causes, as a consequence, the counter 322 to deliver the signal "START-2" simultaneously with the energization of the magnetic drive coupling 111-A (211-75). In this manner the signal "START-2" is again generated at the moment when the leading edge of the original sheet has passed the roller-pair 72 and is on its way to the entry 61 of the conveyor track 40. As a second consequence, the signal "START-3" causes the counter 322 to start counting the number of pulses N7, after which the counter 322 generates the signal "STOP-2".

The program is repeated again and again, because the signals "START-2" and "STOP-2" are the only main control signals and because these signals generate themselves automatically by means of the signal "START-3". However, this cycle can be interrupted by the copy counter 332. The copy counter 332 counts the number of copies still to be made. At a given moment the number of copies still to be made becomes equal to one. Then, the OR-gate 328 sets the mechanism 329 into operation for opening the guide plate 45. Moreover, the copy counter generates the signal "RESET", by which the counter 322 is set to zero and is rendered insensitive to the signal "START-3". Since the guide plate 45 is now in the open position, the original sheet is conveyed to the tray 38, by means of the guide plate 45, after it has been conveyed past the exposure slit 3 for the last time. The apparatus is now ready for conveying a next original one or more times past the exposure slit 3.

We claim:

1. In an apparatus for conveying a sheetlike original to be copied past the exposure window of a copying machine, which apparatus includes a feed section, an exposure section provided with the exposure window, with an entry, with an exit and with conveying and guiding elements, an ejection section and return means, to be selectively engaged, for returning an original from the exit to the entry of the exposure section, the improvement wherein the return means comprises at least two sets of gripping and conveying elements mounted in a common supporting element which can be displaced cyclically to a number of positions, in each position of the supporting element and with the return means being engaged, one set occupying a first location situated in a path of movement of an original sheet leaving the exposure section, and the other set occupying a second location situated in a path of movement joining the entry to the exposure section, switching means for switching the gripping and conveying elements of each set on and off, the gripping elements being switched off and the conveying elements being switched on as soon as a set arrives in the second location, and the gripping elements being switched on and the conveying elements being switched off when a set is in the first location and after an original sheet has been gripped by this set by at least its leading edge, and means for displacing the supporting element after the trailing edge of an original sheet has passed the entry of the exposure section.

2. The improved apparatus as claimed in claim 1 further comprising a movable guiding element located between the exit of the exposure section and the set of gripping and conveying elements in the first location, the guiding element being movable between a closed and an open position, the guiding element forming a bridge between the exit of the exposure section and the set of gripping and conveying element in the first location when the guiding elements is in its closed position.

3. The improved apparatus as claimed in claim 2 further comprising means for moving the movable guiding element from the closed position to the open position as soon as the original sheet has been gripped by its leading edge by the set of gripping and conveying elements in the first location, and from the open position to the closed position after the trailing edge of the original sheet has passed the exit of the exposure section.

4. The improved apparatus as claimed in claim 2, wherein the supporting element comprises a plurality of guiding elements which form a plurality of conveyor tracks for the original sheet and guide the original sheet from and to the gripping and conveying elements, the guiding elements being arranged such that in each of the positions of the supporting element a first conveyor track is operatively connected to the movable guiding element for original sheet conveyance when the movable guiding element is in the closed position, and a second conveyor track is operatively connected with the entry of the exposure section.

5. The improved apparatus as claimed in claim 1 wherein the number of positions into which the supporting element can be displaced is equal to the number of sets of gripping and conveying elements mounted thereon.

6. The improved apparatus as claimed in claim 5 wherein the sets of gripping and conveying elements are mounted equidistantly in the supporting element.

7. The improved apparatus as claimed in claim 6 wherein the means for displacing the supporting element comprises a gear transmission having a transmission ratio equal to the number of positions of the element.

8. The improved apparatus as claimed in claim 1 wherein each set of gripping and conveying elements comprises a pair of rollers which can be driven.

9. The improved apparatus as claimed in claim 8 further comprising a magnetic coupling operatively associated with the pair of rollers to drive them when they are in the first and second location.

10. The improved apparatus as claimed in claim 9 further comprising providing each pair of rollers with a magnetic brake coupling and wherein a continuously driven magnetic drive coupling is operatively located opposite to each brake coupling when the pair of rollers are in the first and the second location.

11. The improved apparatus as claimed in claim 9 further comprising providing each pair of rollers with a magnetic coupling comprising a magnetic drive coupling and a magnetic brake coupling, and each drive coupling being provided with drive means which continuously drive the drive coupling.

12. The improved apparatus as claimed in claim 11 wherein the pairs of rollers are arranged along the circumference of a circle and the drive means comprise a gear, each gear being in contact with and driven by a centrally and continuously driven gear.

13. An apparatus for conveying original sheet material to be copied past the exposure window of a copying machine, the apparatus comprising a feed section, an exposure section having an exposure window, an entry, an exit and conveying and guiding elements, an ejection section and selectively engagable return means for returning an original from the exit to the entry of the exposure section, the return means comprising at least two sets of gripping and conveying driven roller pairs mounted equidistantly in a common supporting element which can be displaced cyclically to a number of positions, in each position of the supporting element and with the return means being engaged, one roller-pair occupying a first location situated in a path of movement of an original sheet leaving the exposure section, and the other roller-pair occupying a second location situated in a path of movement joining the entry to the exposure section, a movable guiding element located between the exit of the exposure section and the roller-pair in the first location, the guiding element being movable between a closed and an open position, the guiding element forming a bridge between the exit of the exposure section and the roller pair in the first location when the guiding element is in its closed position, the supporting element including a plurality of guiding elements which form a plurality of conveyor tracks for the original sheet and guide the original sheet from and to the gripping and conveying roller-pair, the guiding elements being arranged such that in each of the positions of the supporting element a first conveyor track is operatively connected to the movable guiding element for original sheet conveyance when the movable guiding element is in the closed position, and a second conveyor track is operatively connected with the entry of the exposure section, a magnetic coupling operatively associated with each roller-pair, the magnetic coupling including a continuously driven magnetic drive coupling and a magnetic brake coupling, switching means for causing the magnetic coupling to operate the gripping and conveying roller-pair of each set to switch them on and off, the roller-pair functioning as a gripping element when the magnetic brake coupling is operatively connected thereto, the roller-pair functioning as a conveying element when the magnetic drive coupling is operatively connected thereto, the magnetic brake coupling being switched off and the magnetic drive coupling being switched on as soon as a roller-pair arrives into the second location, and the magnetic brake coupling being switched on and the magnetic drive coupling being switched off when a roller-pair is in the first location and after an original sheet has been gripped by this roller-pair by at least its leading edge, means for moving the movable guiding element from the closed position to the open position as soon as the original sheet has been engaged by its leading edge by the roller pair in the first location, and from the open position to the closed position after the trailing edge of the original sheet has passed the exit of the exposure section, gear transmission means for displacing the supporting element after the trailing edge of an original sheet has passed the entry of the exposure section, the gear transmission means having a transmission ratio equal to the number of positions of the supporting element and the number of positions of the supporting element being equal to the number of sets of gripping and conveying roller-pairs.

* * * * *